(No Model.)
D. H. MURPHY.
KETTLE COVER.
No. 334,716. Patented Jan. 19, 1886.
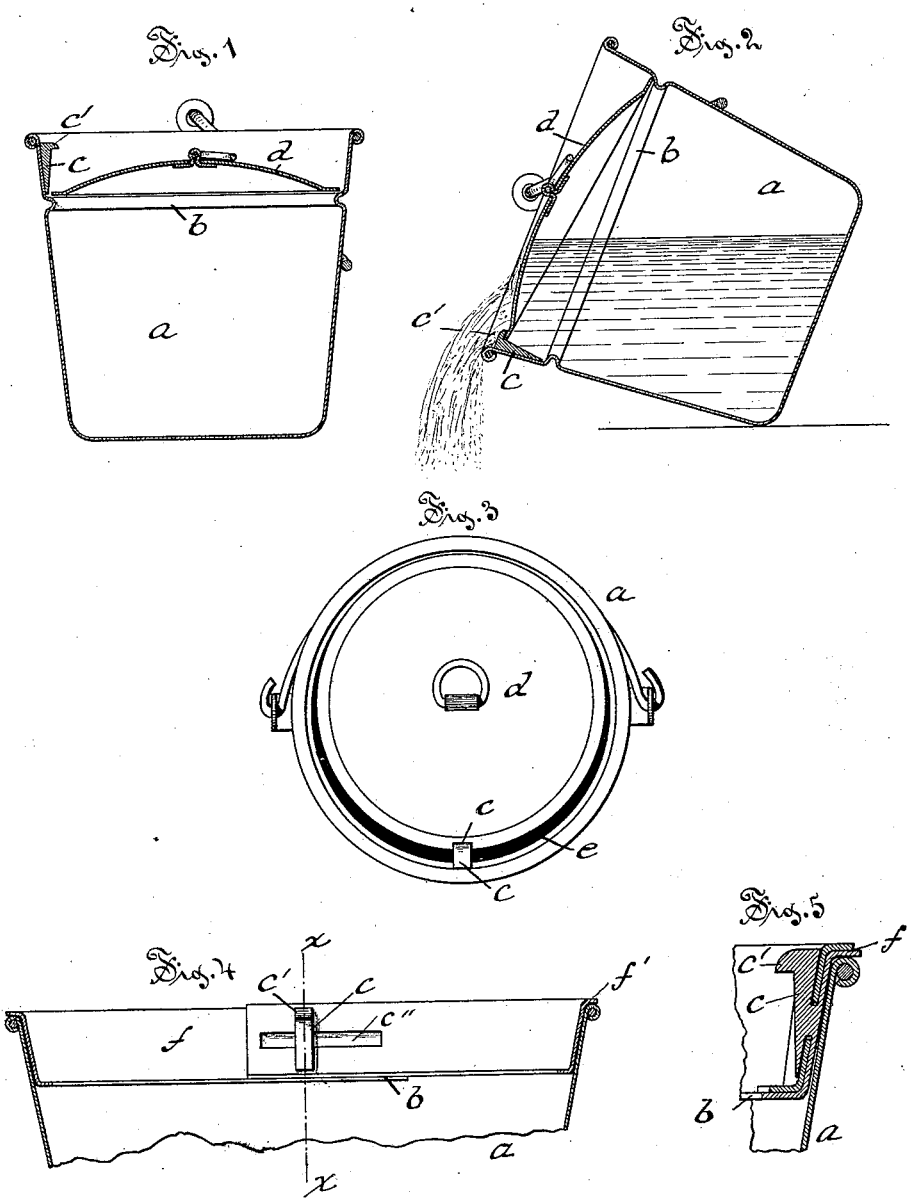

UNITED STATES PATENT OFFICE.

DANIEL H. MURPHY, OF HARTFORD, ASSIGNOR OF ONE-FOURTH TO ELIAS M. STEELE, OF NEWINGTON, CONNECTICUT.

KETTLE-COVER.

SPECIFICATION forming part of Letters Patent No. 334,716, dated January 19, 1886.

Application filed May 29, 1885. Serial No. 167,037. (No model.)

*To all whom it may concern:*

Be it known that I, DANIEL H. MURPHY, of Hartford, in the county of Hartford and State of Connecticut, have invented certain new and useful Improvements in Culinary Utensils, of which the following is a description, reference being had to the accompanying drawings, where—

Figure 1 is a view in central vertical section of a kettle embodying my improvement. Fig. 2 is a like sectional view of the kettle, showing it tipped and the liquid part of the contents running out. Fig. 3 is a top view of the kettle, with the cover in the position as shown in Fig. 2. Fig. 4 is a detail view, in central vertical section, of a kettle with an alternate form of my device. Fig. 5 is a view in cross-section of the latter on plane denoted by line $x\ x$ of Fig. 4.

The object of my improvement is to provide a culinary utensil with means for preventing the overflow of the contents of the vessel when boiling, and also to enable the liquid parts only of the contents of the vessel to be poured out without removing the cover; and to this end my invention consists in the combination of a cover supported within and some distance below the top of the vessel with a catch of a peculiar construction attached to one side only of the vessel, as more particularly hereinafter described.

In the accompanying drawings, where like letters of reference refer to like parts throughout, the letter $a$ denotes a pail or kettle of ordinary material—as iron or tin, or the like—provided with an inward-projecting cover-support, $b$, located some distance below the upper edge of the vessel. This support may be made either by soldering or otherwise fastening to the inside of the vessel a ring of wire or a number of brackets, or, preferably, as in the case of tinware, by forming, as in the process of manufacture, an inward-projecting bead, as illustrated in Fig. 1. On one side of the vessel and above this cover-support is attached an inward-projecting stop, $c$, which is somewhat narrow and bears the lug $c'$, which projects still farther inward, so as to prevent the cover from being pushed off when the vessel is tipped toward the side bearing the stop.

The cover $d$ is of ordinary material and construction, and of such diameter as to fit loosely within the pail while resting upon the cover-support, in such manner as to be easily lifted, as by means of the steam or the boiling contents of the vessel, such lifting of the cover allowing the steam to escape without a chance of the contents boiling over. This cover $d$ may be placed upon the vessel by first inserting one edge in place below the stop with the cover in a diagonal position, and then lowering it in place, turning upon the edge which is in contact with the cover-support and side of the vessel just below the stop.

In order to pour from the vessel the liquid part of its contents, it is tilted upon its edge on the side directly below the stop $c$, so that the cover, lifting up on that side and turning upon its edge diametrically opposite the stop, will assume the position illustrated in Figs. 2 and 3, leaving between the edge of the vessel on the side of the stop and the edge of the cover a space, $e$, as shown in Fig. 3, and through this space the liquid contents will flow.

In order to make my improvement applicable to the vessels in common use without any change in such utensil, I make use of an alternate form of my device, which consists of the expanding ring $f$, having an outward-turned flange or like device, $f'$, to support it on the vessel, and the inturned cover-support $b$, and bearing the stop $c$, identical in form and office with that already described, and serving in this case the added function of a button, to prevent the separation of the ends of the ring, the stop being soldered to the inner side of the stud, which is fast to the inside at one end of the ring and projects through the slot $c''$ in the other end of the ring, as clearly shown in Figs. 4 and 5.

I do not limit myself to the use of a single stop, as herein illustrated, as it is evident that two or more such narrow stops may be attached at one side of the vessel or household utensil and yet come within the scope of my invention, so long as the material point of forming a catch or stop to prevent the cover from be forced off, and at the same time pushing it aside, so as to leave a space between the cover and the wall of the vessel, is preserved.

I claim as my invention—

1. In combination, the pail $a$, with the cover-support $b$, located below the upper rim of the vessel, the stop $c$, fast to the inner side of the vessel above the cover-support, and having the projecting lug $c'$, and the cover $d$, fitting within the vessel and suspended upon the cover-support, all substantially as described.

2. In combination, a culinary or the like household utensil having a cover-support fixed within the vessel and below its upper edge, an inward-projecting stop secured on one side within the vessel and above the support, whereby the cover is pushed aside and also held in the vessel, and a loosely-fitting cover adapted to rest upon the support within the vessel, all substantially as described.

3. In combination with a culinary or the like household utensil, an expansible ring fastened within the mouth of the vessel, and having an inturned flange for supporting a cover, and also an inward-projecting stop attached to the ring at one side, and a loosely-fitting cover suspended upon the cover-support within the vessel and below its rim, all substantially as described.

DANIEL H. MURPHY.

Witnesses:
CHAS. L. BURDETT,
H. R. WILLIAMS.